US011204112B2

(12) United States Patent
Bolea et al.

(10) Patent No.: US 11,204,112 B2
(45) Date of Patent: Dec. 21, 2021

(54) SYSTEMS AND METHODS FOR SMART HOSES AND SMART HOSE CONSTRUCTION

(71) Applicant: Carlisle Fluid Technologies, Inc., Scottsdale, AZ (US)

(72) Inventors: Phillip Angelo Bolea, Grant, MN (US); Eric Julius Donaldson, Saint Paul, MN (US); Christopher J. Anton, Rosemount, MN (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 0 days.

(21) Appl. No.: 16/040,529

(22) Filed: Jul. 19, 2018

(65) Prior Publication Data

US 2019/0024824 A1    Jan. 24, 2019

Related U.S. Application Data

(60) Provisional application No. 62/535,556, filed on Jul. 21, 2017.

(51) Int. Cl.
*F16L 11/00* (2006.01)
*F16L 11/127* (2006.01)
(Continued)

(52) U.S. Cl.
CPC ............ *F16L 11/00* (2013.01); *B05B 7/1693* (2013.01); *F16L 11/086* (2013.01); *F16L 11/127* (2013.01); *F16L 25/01* (2013.01); *H01B 7/04* (2013.01); *H01B 7/282* (2013.01); *H01B 13/0036* (2013.01); *H01R 13/005* (2013.01);
(Continued)

(58) Field of Classification Search
CPC ........ F16L 11/127; F16L 25/01; F16L 11/086; B05D 7/1693; B05B 7/1693; B05B 7/0018; B05B 7/0408; B05B 12/1418; H01B 7/04; H01B 7/282; H01B 13/0036; H01B 13/2606; H01B 13/005; H01B 4/183; H01B 4/72; H01B 9/0518; H01B 24/38;
(Continued)

(56) References Cited

U.S. PATENT DOCUMENTS

| 511,188 | A | * | 12/1893 | Barnard | ............... | H01R 13/005 |
| | | | | | | 439/192 |
| 3,140,884 | A | * | 7/1964 | Brauck | ................... | F16L 33/22 |
| | | | | | | 285/242 |

(Continued)

FOREIGN PATENT DOCUMENTS

| CN | 1441883 A | 9/2003 |
| JP | H01265977 A | 10/1989 |
| JP | 2017029903 A | 2/2017 |

OTHER PUBLICATIONS

PCT International Search Report & Written Opinion for PCT Application No. PCT/US2018/043178 dated Oct. 1, 2018, 18 pgs.

(Continued)

*Primary Examiner* — William M McCalister
(74) *Attorney, Agent, or Firm* — Fletcher Yoder, P.C.

(57) ABSTRACT

A fluid delivery system includes one or more smart hoses. A smart hose of the one or more smart hoses includes a fluid conduit configured to deliver a fluid. The smart hose further includes a first electrically conductive element configured to deliver electricity through a length of the smart hose.

14 Claims, 7 Drawing Sheets

(51) Int. Cl.
*F16L 25/01* (2006.01)
*H01B 7/04* (2006.01)
*H01R 13/00* (2006.01)
*B05B 7/00* (2006.01)
*B05B 12/14* (2006.01)
*H01B 13/26* (2006.01)
*B05B 7/16* (2006.01)
*F16L 11/08* (2006.01)
*H01B 7/282* (2006.01)
*H01B 13/00* (2006.01)
*H01R 9/05* (2006.01)
*B05B 7/04* (2006.01)
*H01R 4/18* (2006.01)
*H01R 4/72* (2006.01)
*H01R 24/38* (2011.01)

(52) U.S. Cl.
CPC .......... *B05B 7/0018* (2013.01); *B05B 7/0408* (2013.01); *B05B 12/1418* (2013.01); *H01B 13/2606* (2013.01); *H01R 4/183* (2013.01); *H01R 4/72* (2013.01); *H01R 9/0518* (2013.01); *H01R 24/38* (2013.01)

(58) Field of Classification Search
CPC ........ H01R 13/005; H01R 4/183; H01R 4/72; H01R 9/0518; H01R 24/38
See application file for complete search history.

(56) References Cited

U.S. PATENT DOCUMENTS

| | | | | |
|---|---|---|---|---|
| 3,749,814 A | | 7/1973 | Pratt | |
| 3,963,856 A | * | 6/1976 | Carlson | F16L 11/1185 174/47 |
| 4,009,733 A | * | 3/1977 | Schnabel | F16L 11/12 138/103 |
| 4,901,975 A | * | 2/1990 | Gill | B05B 9/08 174/47 |
| 5,022,864 A | * | 6/1991 | Ali | B05B 9/08 439/192 |
| 5,222,770 A | * | 6/1993 | Helevirta | F16L 25/023 174/47 |
| 7,018,221 B2 | * | 3/2006 | Daume | F16L 25/01 439/100 |
| 8,399,767 B2 | * | 3/2013 | Duquette | F16L 9/147 174/84 R |
| 8,944,471 B2 | * | 2/2015 | Rodenburg | F16L 33/01 285/222.1 |
| 2001/0032892 A1 | | 10/2001 | Brooks et al. | |
| 2005/0279865 A1 | | 12/2005 | Thomason et al. | |
| 2006/0289561 A1 | | 12/2006 | Bourget et al. | |
| 2009/0071665 A1 | | 3/2009 | Shoap | |
| 2010/0007325 A1 | | 1/2010 | Stark | |

OTHER PUBLICATIONS

Chinese Office Action for CN Application No. 201880059977.7, dated Mar. 17, 2021, 11 pgs.
Japanese Office Action for JP Application No. 2020-502567, dated Apr. 6, 2021, 4 pgs.
Japanese Office Action for JP Application No. 2020-502567, dated Aug. 10, 2021, 4 pgs.
European Office Action for EP Application No. 18752359.2, dated Sep. 23, 2021, 8 pgs.

* cited by examiner

| CRIMPED TERMINATIONS SHIELD CRIMPS ||
|---|---|
| SHIELDED TWINADAL CABLE | SHIELD CRIMPS<br>SHIELD CRIMPS ARE USED TO MECHANICALLY "FINISH" THE END OF INDIVIDUALLY SHIELDED CABLES.<br><br>FOR GROUND SHIELD TERMINATIONS, THE CRIMP ASSEMBLY WILL HAVE A GROUNDING WIRE ATTACHMENT, ALLOWING THE CABLE SHIELD TO BE ELECTRICALLY TERMINATED TO GROUND.<br><br>FOR FLOATING SHIELD TERMINATIONS, THE CRIMP ASSEMBLY WILL BE COMPLETED WITHOUT THE GROUND WIRE ATTACHMENT. |
| ACCEPTABLE<br>INTERIM ASSEMBLY VIEW<br>OUTER CRIMP RING HAS BEEN DEFORMED ONLY BY TOOL INDENTERS, WITH INDENTS PROPERLY LOCATED AND SYMMETRICAL. INNER CRIMP RING HAS NOT BEEN DEFORMED. NO EXPOSED BASE METAL. GROUND WIRE HAS PROPER INSULATION SPACING AND END IS VISIBLE. | ACCEPTABLE<br>GROUND SHIELD TERMINATION<br>HEAT SHRINK SECTIONS ARE PROPERLY INSTALLED, TIGHTLY SHRUNK, AND THE TERMINATION IS VISIBLE. OVERLAPS MEET MINIMUM ELECTRICAL SPACING. GROUND WIRE EXHIBITS PROPER BEND RADIUS AND STRAIN RELIEF. |
| ACCEPTABLE<br>FLOATING SHIELD TERMINATION<br>HEAT SHRINK TUBING IS PROPERLY INSTALLED, TIGHTLY SHRUNK, AND THE TERMINATION IS VISIBLE. OVERLAPS ARE OF SUFFICIENT LENGTH TO MEET MINIMUM ELECTRICAL SPACING. | MANDATORY<br>GROUND WIRE OVERHANG<br>THE END OF THE GROUND WIRE SHALL BE FLUSH WITH THE OUTER FERRULE EDGE, BUT SHALL NOT OVERHANG THE INNER FERRULE EDGE. |

SYSTEMS AND METHODS FOR SMART HOSES AND SMART HOSE CONSTRUCTION

CROSS REFERENCE TO RELATED APPLICATIONS

This application claims priority from and the benefit of U.S. Provisional Application Ser. No. 62/535,556, entitled "SYSTEM AND METHODS FOR SMART HOSES AND SMART HOSE CONSTRUCTION," filed Jul. 21, 2017, which is hereby incorporated by reference in its entirety for all purposes.

Flexible hoses may be used for transporting fluid materials between sections of an overall hydraulic system. An example of a hydraulic system can be found in Spray Polyurethane Foam (SPF) systems used for applying foam insulation to residential or commercial structures. These systems deliver two or more materials through hoses from a stationary pumping system (e.g., proportioner system) to a spray foam gun used to apply the material to a structure. The proportioner system may be located at a distance from the actual foam application work area and spray foam gun. It would be useful to improve communications between sections of hydraulic systems, such as an area near the proportioner system and an area near the spray gun.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, A fluid delivery system includes one or more smart hoses. A smart hose of the one or more smart hoses includes a fluid conduit configured to deliver a fluid. The smart hose further includes one or more electrically conductive elements configured to deliver electricity through a length of the smart hose.

In a second embodiment, a method of manufacturing a flexible smart hose includes manufacturing a hollow conduit, wherein the hollow conduit is configured to deliver a fluid. The method further includes manufacturing one or more electrically conductive layers, wherein the conductive layer is configured to deliver electricity through a length of the smart hose. The method additionally includes manufacturing an external jacket, wherein the external jacket comprises the topmost layer of the smart hose.

In a third embodiment, a fluid delivery system includes a proportioner system configured to control a pressure, a temperature, a flow, or a combination thereof, of a first fluid and of a second fluid. The SPF system additionally includes at least one smart hose configured to deliver the first or the second fluid to a spray gun, wherein the smart hose comprises a hollow conduit configured to deliver the first or the second fluid and one or more conductive layers configured to deliver electricity through a length of the smart hose.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed to systems and methods for smart hoses and smart hose construction. The smart hoses described herein provide for fluid conduits in certain systems, such as s Spray Polyurethane Foam (SPF) systems. The smart hoses additionally provide for communication conduits. Indeed, the hose may work as an electrical signal cable in addition to working as a fluid conduit. While, in order to provide context, the smart hose systems described herein are described in view of their application to SPF systems, other applications may include paint spray systems, industrial/chemical mixing and processing systems, fuel and hydraulic delivery systems, and so on. Indeed, a system that would benefit from delivering fluid as well as electric signals may incorporate the techniques described herein.

The techniques described herein incorporate electrically conductive elements into the actual hose construction to eliminate the need for a separate wire harness or a separate wire. The techniques described herein also eliminate intermediate electrical connectors by using, for example, hydraulic fittings for conduction of electrical power and/or signals through any intermediate fluid connections. In some cases, the electrically conductive elements server as both a signal and/or power conductor and a mechanical reinforcement member.

It may be useful to describe a system that may apply the fluid delivery and the electrical deliver techniques described herein. Accordingly and turning now to FIG. 1, the figure is a block diagram illustrating an embodiment of a spray application system 10 (e.g., Spray Polyurethane Foam (SPF) system) that may include one or more liquid pumps 12, 14. The spray application system 10 may be suitable for mixing and dispensing a variety of chemicals, such as a chemicals used in applying spray foam insulation. In the depicted embodiment, chemical compounds A and B may be stored in tanks 16 and 18, respectively. The tanks 16 and 18 may be fluidly coupled to the pumps 12 and 14 via conduits or hoses 20 and 22. It is to be understood that while the depicted embodiment for the spray application system 10 shows two compounds used for mixing and spraying, other embodiments may use a single compound or 3, 4, 5, 6, 7, 8 or more compounds. The pumps 12 and 14 may be independently controlled.

Figure 1:
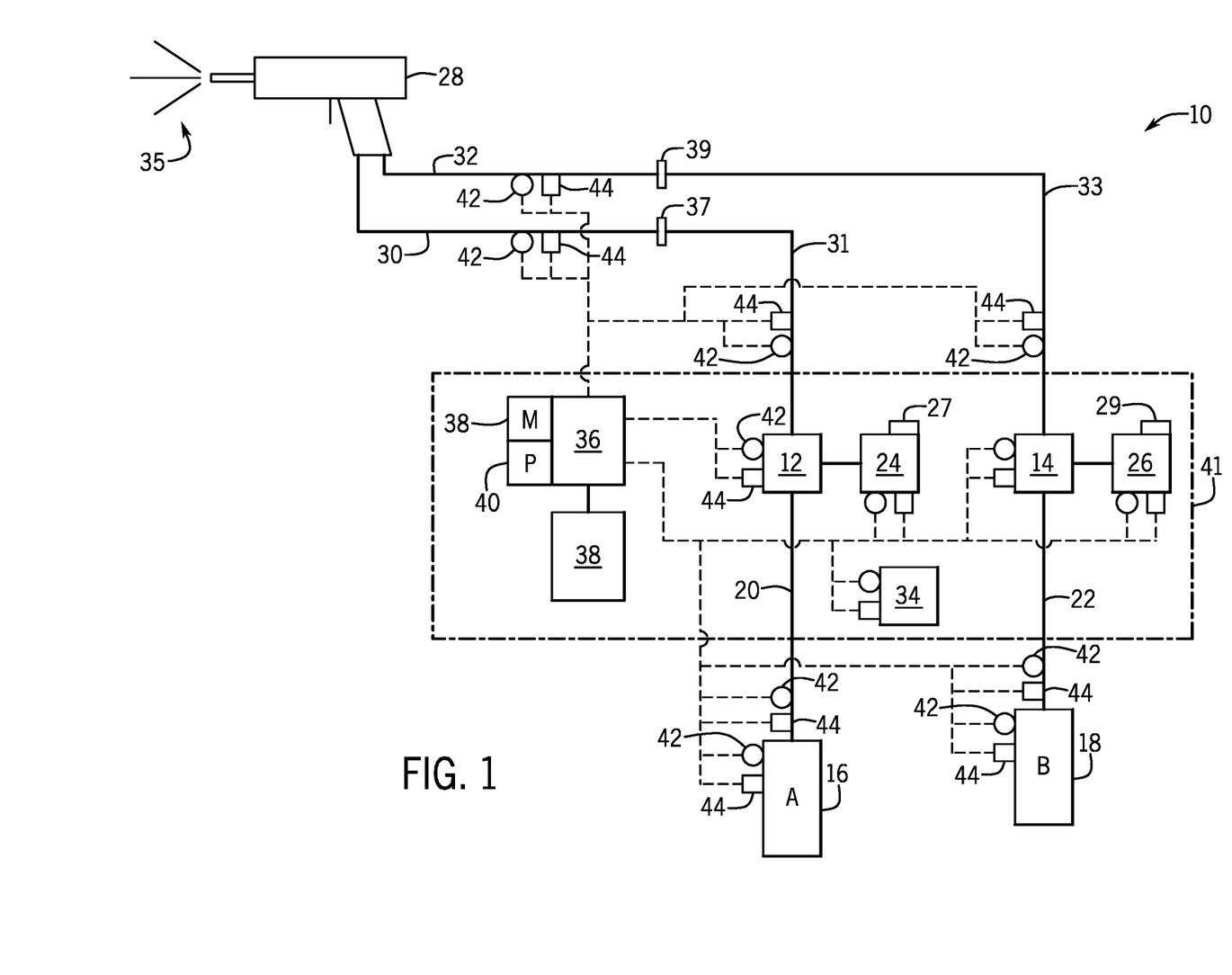
FIG. 1 is block diagram of an embodiment of a spray application system, such as a multi-component fluid delivery system (e.g., SPF system)

During operations of the spray application system 10, the pumps 12, 14 may be mechanically powered by motors 24, 26, respectively. In a preferred embodiment, the motors may be electric motors. However, internal combustion engines (e.g., diesel engines), pneumatic motors, or a combination thereof. Motor controllers 27 and 29 may be used to provide for motor start/stop, loading, and control based on signals transmitted, for example, from the processor 40. The motor 24 may be of the same type or of a different type from the motor 26. Likewise, the pump 12 may be of the same type or of different type from the pump 14. Indeed, the techniques described herein may be used with multiple pumps 12, 14, and multiple motors 24, 26, which may be of different types.

The pumps 12, 14 provide for hydrodynamic forces suitable for moving the compounds A, B into a spray gun system 28. More specifically, compound A may traverse the pump 12 through conduit 20 and then through heated conduits 31, 30 into the spray gun system 28. Likewise, compound B may traverse pump 14 through conduit 22 and then through heated conduits 33, 32 into the spray gun system 28. To heat the heated conduits 20, 22, 30, 31, 32, 33, a heating system 34 may be provided. The heating system 34 may provide for thermal energy, such as a heated fluid, suitable for pre-heating the compounds A and B before mixing and spraying and for heating the compounds A and B during mixing and spraying. The conduit 31 may be connected to the conduit 30 via a hose fitting 37. The conduit 33 may be connected to the conduit 32 via a hose fitting 39.

The spray gun system 28 may include a mixing chamber to mix the compounds A and B. For spray foam insulation applications, the compound A may include isocyanates while the compound B may include polyols, flame retardants, blowing agents, amine or metal catalysts, surfactants, and other chemicals. When mixed, an exothermic chemical reaction occurs and a foam 35 is sprayed onto a target. The foam then provides for insulative properties at various thermal resistance (i.e., R-values) based on the chemicals found in the compounds A and B.

Control for the spray application system 10 may be provided by a control system 36. The control system 36 may include an industrial controller, and thus include a memory 38 and a processor 40. The processor 40 may include multiple microprocessors, one or more "general-purpose" microprocessors, one or more special-purpose microprocessors, one or more application specific integrated circuits (ASICS), and/or one or more reduced instruction set (RISC) processors, or some combination thereof. The memory 38 may include a volatile memory, such as random access memory (RAM), and/or a nonvolatile memory, such as ROM, a hard drive, a memory card, a memory stick (e.g., USB stick) and so on. The memory 38 may include computer programs or instructions executable by the processor 40 and suitable for controlling the spray application system 10. The memory 38 may further include computer programs or instructions executable by the processor 40 and suitable for detecting pump 12, 14 slip and for providing ratio control actions to continue providing as desired ratio (e.g., 1:1) for compounds A and B in the presence of slip, as further described below.

The control system 36 may be communicatively coupled to one or more sensors 42 and operatively coupled to one or more actuators 44. The sensors 42 may include pressure sensors, flow sensors, temperature sensors, chemical composition sensors, speed (e.g., rotary speed, linear speed) sensors, electric measurement sensors (e.g., voltage, amperage, resistance, capacitance, inductance), level (e.g., fluid level) sensors, limit switches, and so on. The actuators 44 may include valves, actuatable switches (e.g., solenoids), positioners, heating elements, and so on.

A user or users may interface with the control system 36 via an input/output (I/O) system 38, which may include touchscreens, displays, keyboards, mice, augmented reality/virtual reality systems, as well as tablets, smartphones, notebooks, and so on. A user may input desired pressures, flow rates, temperatures, ratio between compound A and compound B (e.g., 1:1), alarm thresholds (e.g., threshold fluid levels of compound A, B in tanks 16, 18), and so on. The user may then spray via the spray gun system 28 and the control system 36 may use the processor 40 to execute one or more programs stored in the memory 38 suitable for sensing system 10 conditions via the sensors 42 and for adjusting various parameters of the system 10 via the actuators 44 based on the user inputs. The I/O system 38 may then display several of the sensed conditions as well as the adjusted parameters. Certain components of the spray application system 10 may be included in or interface with a proportioner system 41. The proportioner system 41 may "proportion" or deliver the compounds A, B at a specified ratio (e.g., 1:1) to achieve the spray 35. In this manner, the user(s) may mix and spray chemicals, such as compounds A and B, to provide for certain coatings, such as insulative spray foam.

The proportioner system 41 controls pressure, flow, and temperature of the fluids based on setting provided by the user. The proportioner system 41 is generally located at a distance from the actual foam application work area and spray foam gun 28. In most of these systems, temperature and/or pressure sensing of one or more of the fluids near the spray gun 38 is required to provide proper fluid mixing of the materials at the spray gun. In most of these systems, control parameters and status indicators are all located at the proportioning system 38, which can be several hundred feet away from where the spray foam applicator is working. The spray foam applicator has special skills that determine the success of the operation, however this person does not have access to real-time and sometimes critical system information that affect the quality of the spray foam 35 process. It is not efficient for the spray foam applicator to return to the proportioner system 41 to discover status or diagnostic information about the spray foam application system 10. The spray gun operator wears Personal Protective Equipment (PPE) that further burdens his/her ability to return to the proportioner system 41 to adjust settings and/or determine status of the equipment and material supplies. The pressurized hoses 20, 22, 30, 31, 32 and/or 33 operate in a harsh environment and are subject to abuse typical of construction sites.

To date, most systems 10 that employ remote sensing and/or control capabilities do so with dedicated wired cables (i.e. a "tethered" system). The use of wireless communication with remote power sources is also an approach to providing electrical sensing, communication, and control signals between portions of a hydraulic system. Both of these approaches may have problems with reliability. In the case of the tethered approach, extra wire bundles and connectors are points of potential failure. In the case of a wireless approach, building materials and the RF environment in the work area may prevent reliable signal transmission. Also, in a wireless approach, any power required in the work area must be provided via storage devices (e.g. batteries) or by a local power source. This may add complexity and additional points of potential failure to the system.

The techniques described herein include novel solutions to the issues outlined above, and present new unanticipated capabilities for fluid delivery systems, and in particular, to SPF systems such as system 10. Other examples include paint spray systems, industrial/chemical mixing and processing, systems, and fuel and hydraulic delivery systems. Any process or system that uses a hose to transport fluids from one location to another and where electronic communication of information is desired, are candidates for the techniques described herein.

The flexible hoses 20, 22, 30, 31, 32 and/or 33 may not only provide for the delivery of fluids, but also for the delivery of electricity (e.g., electrical signals such as data signals, electrical power). Likewise, the hose fittings 37, 39 may not only connect the hoses 30, 31, and 32, 33 to each other, but also deliver the electricity between the hoses 30 and 31 and the hoses 32 and 33. To deliver electricity, the hoses 20, 22, 30, 31, 32 and/or 33 may include conductive elements, as described below. The fittings 37, 39 may be made of metal and/or include crimping connections to the conductive elements of the hoses, also as further described below.

The information communicated via the smart hoses may include a fluid pressure, a tank level, a remaining quantity of fluid, a fluid flow rate, a fluid temperature, a pump information (e.g., pump workload, pump voltage, and any pump related data), a text, an audio, a video, a multimedia, a virtual reality data, an augmented reality data, or a combination thereof. A second smart hose of the one or more smart hoses may also attach to an end a first smart hose to increase a length of the first smart hose. The second smart hose may also work in parallel with the first smart hose to deliver fluid, such as when a proportioner system provides for one, two, or more fluids. Each fluid may be delivered via a smart hose. The smart hose may also send information to the proportioner system, such as text, a video, a multimedia, a command to the proportioner system, a request for proportioner system information, or a combination thereof. Indeed, the proportioner system may send and/or receive information via the smart hose(s).

Figure 2:
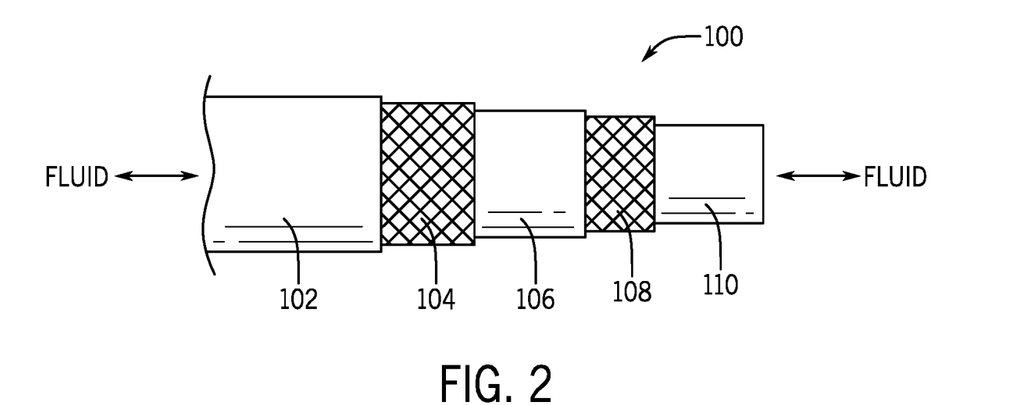
FIG. 2 is a side view of and embodiment of a smart hose that may be included in the spray application system of FIG. 1.

Turning now to FIG. 2, the figure is a side view of an embodiment of an electrically conductive "smart" hose 100. The hose 100 may be included in the hose 20, 22, 30, 31, 32 and/or 33. In the depicted embodiment, the hose 100 may include an outer insulation jacket 102, an outer metal braid (e.g., outer shield) 104, an outer dielectric (e.g., electric insulator) 106, an inner braid 108, and a hollow inner dielectric (e.g., electric insulator) 110. Fluid may flow through the hollow inner dielectric 110, completely traversing the electrically conductive hose 100. The conductive layers or layers 104, 108 lie within the hose 100 construction as braided layers or as a wound wire or foil layer within the hose 100 construction. If a reference layer is required (e.g. neutral, ground, return) then the two layers 104 and 108 of conductive material are required. If two conductive hoses are used, one can be used for the reference power and/or signal. In this two conductive hose scenario, only one conductive element 104 or 108 is used per hose. The conductive layers may be made of metals, metal alloys, or a combination thereof. The dielectric layers may be made of plastics (e.g., polymeric materials, both natural polymers as well as artificial polymers), rubber, silicone, and so on, that have dielectric properties or that are low (or no) conductors of electricity.

Figure 3:
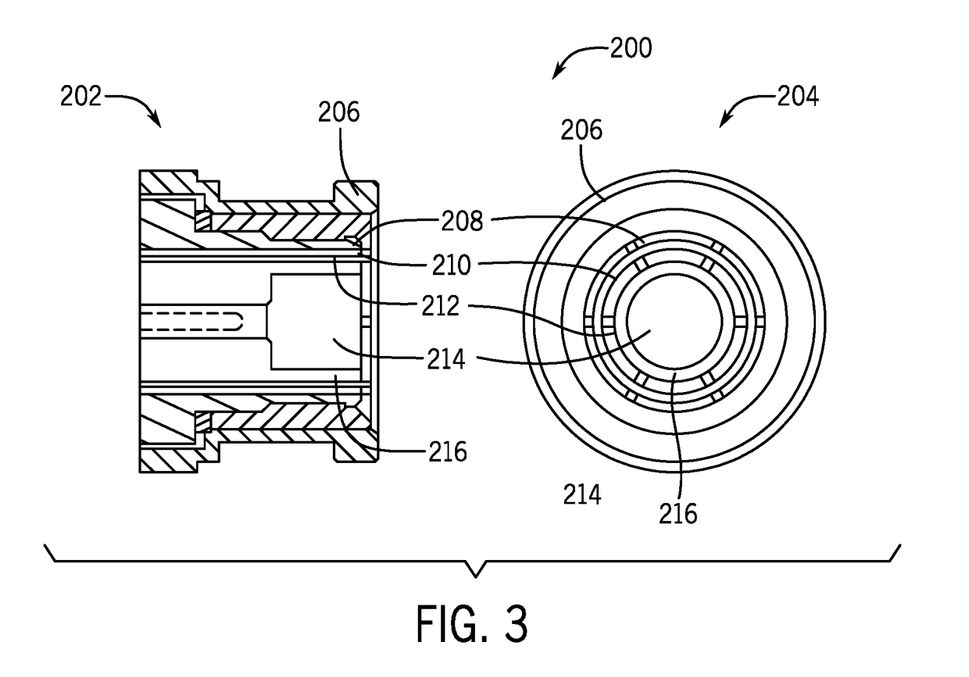
FIG. 3 is a side and front view of an embodiment of a smart hose fitting.

FIG. 3 illustrates an example of a smart hose fitting 200. More specifically, the figure illustrates a side sectional view 202 and a frontal view 204 of an embodiment of the hose fitting 200. In the depicted embodiment, the hose fitting 200 includes a coupling nut 206, which may be used to couple with other hose fittings. The hose fitting 200 also includes an outer contact 208, and outer insulator 210, an inner contact 212, a hollow conduit 214, and an inner insulator 216. The contacts 208, 212 are conductive and may be connected to the conductive elements 104, 108 of the smart hose 100 of FIG. 1. The insulators 210, 216 may provide for electrical insulation and may include dielectric properties.

Figure 4:
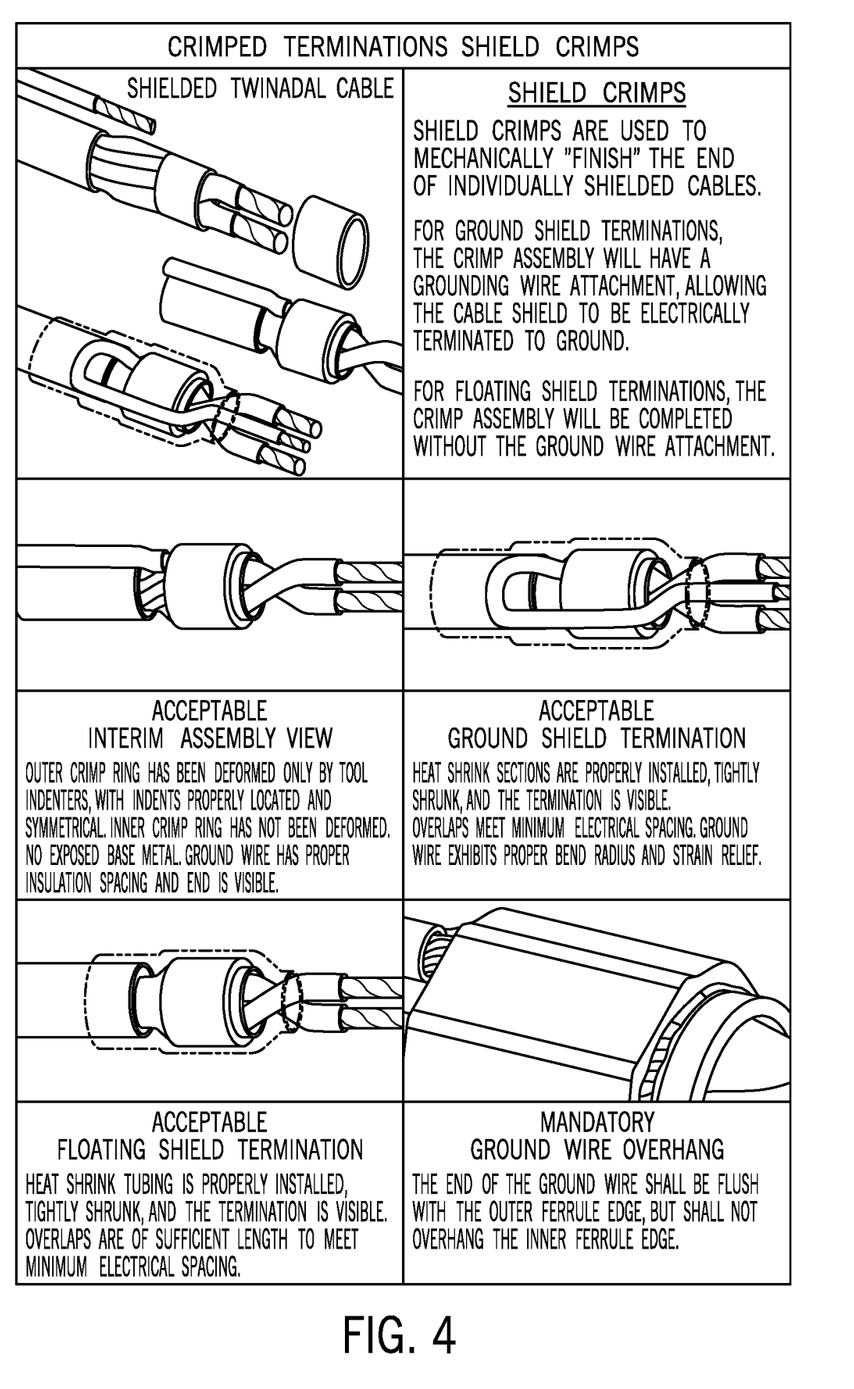
FIG. 4 illustrates embodiments of external wire crimping methods.

To connect the hose fitting 200 to the smart hose 100, crimping may be used. For example, insulating material may stripped away from the smart hose 100 to expose the conductive layer(s) 104, 108. A modified hose fitting (e.g., fitting 200) may be in direct contact with the conductive materials and held in place against mechanical loads. A typical approach may use crimped hydraulic fittings. The fitting 200 now serves as both a hydraulic connection at an electrical buss potential. The mating hose or mating element (e.g. manifold) may or may not have electrical properties. Nonelectrical property hoses (e.g., hoses that do not carry electricity) would serve as isolation elements so that serial groups of different buss voltages or signaling can be fashioned into a linear hose. This could also prevent undesirable shunting of busses. The manifold housing can also serve as an insulator. Examples of external wire crimping methods are shown in FIG. 4. More specifically FIG. 4 illustrates twin axial cables that may be crimped via shield crimps. The shield crimps may be inserted over smart cables and then crimped, e.g. with a crimping tool.

Example Reduction to Practice

Figure 5:
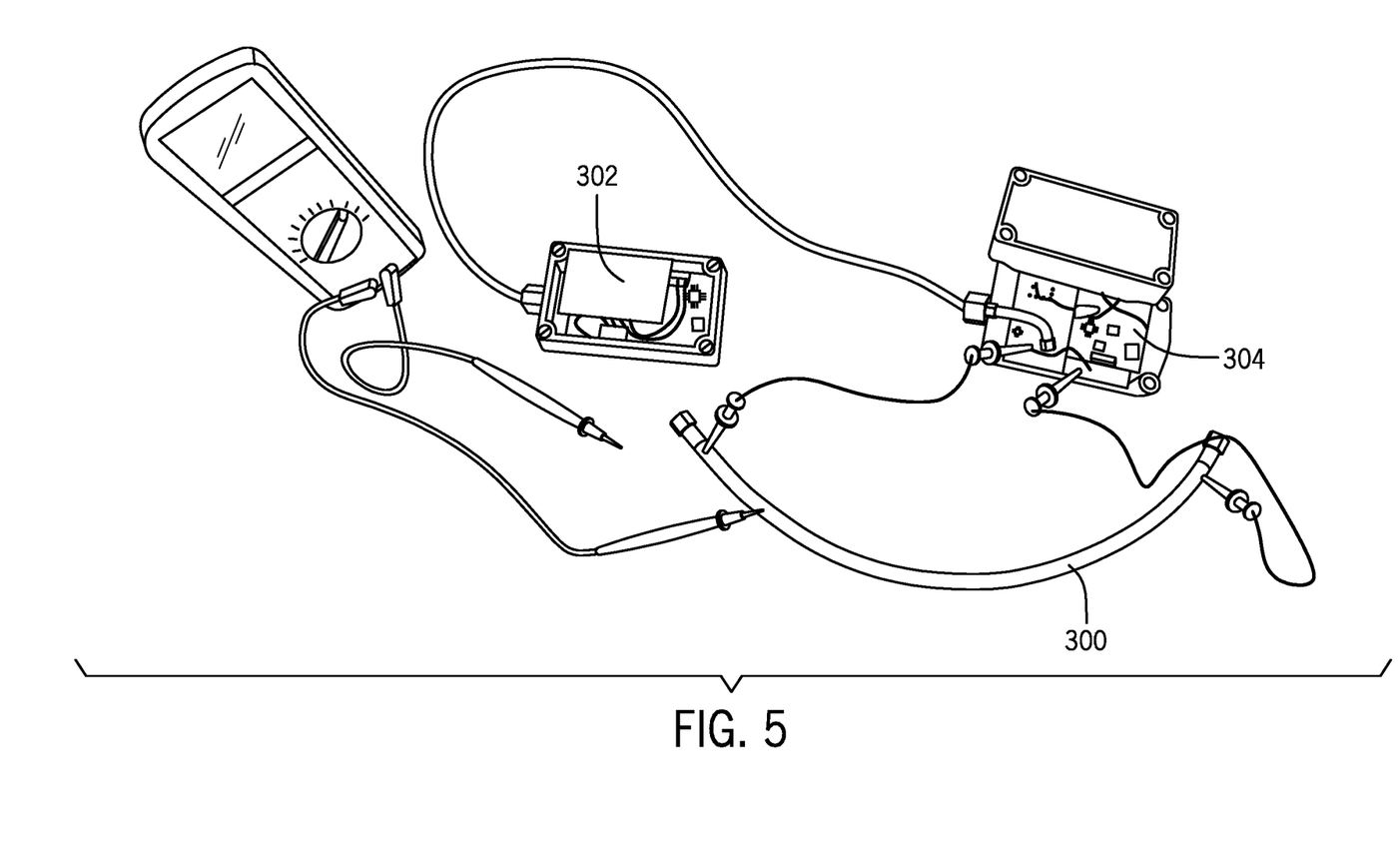
FIG. 5 is a picture an example smart hose reduced to practice.
Figure 6:
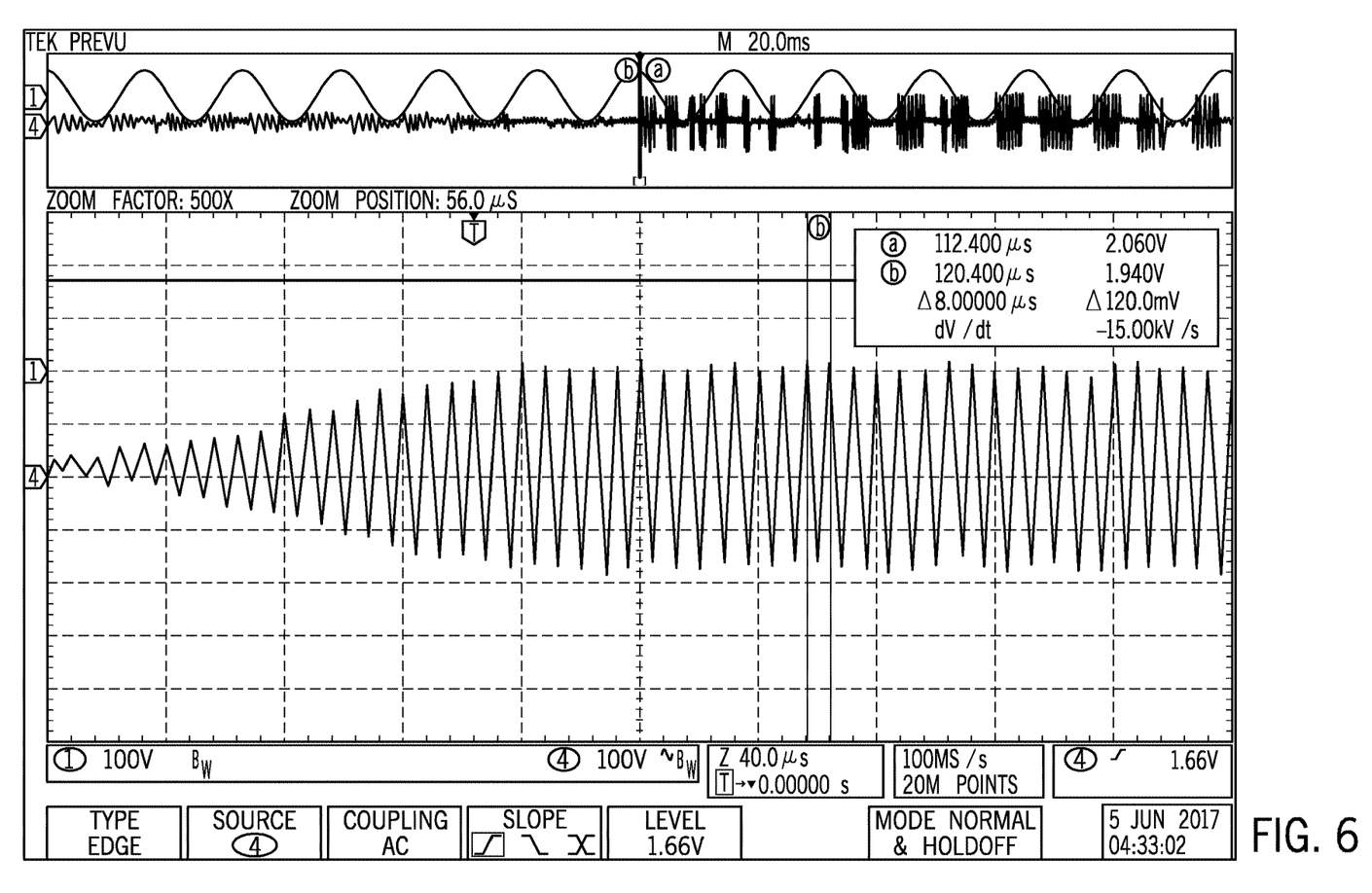
FIG. 6 is a screenshot of an embodiment of one or more oscilloscope traces of signals traversing the smart hose of FIG. 5.

FIGS. 5 and 6 illustrate a picture and a screenshot, respectively, of an example reduction to practice for the hose 100. The reduction to practice was created to demonstrate electrical power transfer and communications over stainless steel reinforcement braid of a common plumbing hose, creating a smart hose 300. An oscilloscope trace depicted in FIG. 6 show Power Line Communication (PLC) using amplitude shift keying. Frequency Modulation over power can also be used for data transmission via the hose 100, 300. Power line modems may be used to communicate over the hose 100, 300. Now turning back to FIG. 5, a master PLC modem 302 on left commanded changes to the LEDs associated with a slave PLC modem 304 on right. The PLC protocol is not critical. There are several PLC standards used in Smart Grid applications. The techniques described herein may use a PLC standard or a proprietary variant.

Figure 7:
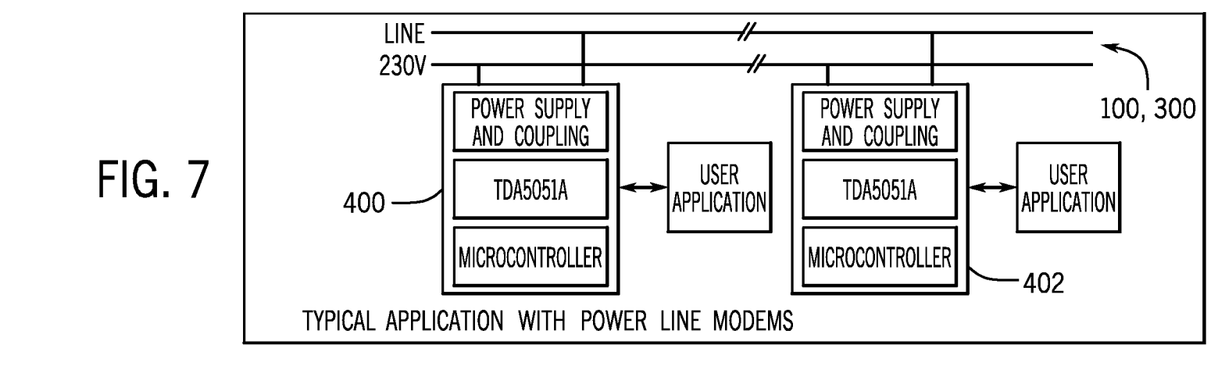
FIG. 7 is a block diagram illustrating an example application of power line modems through a smart hose.
Figure 8:
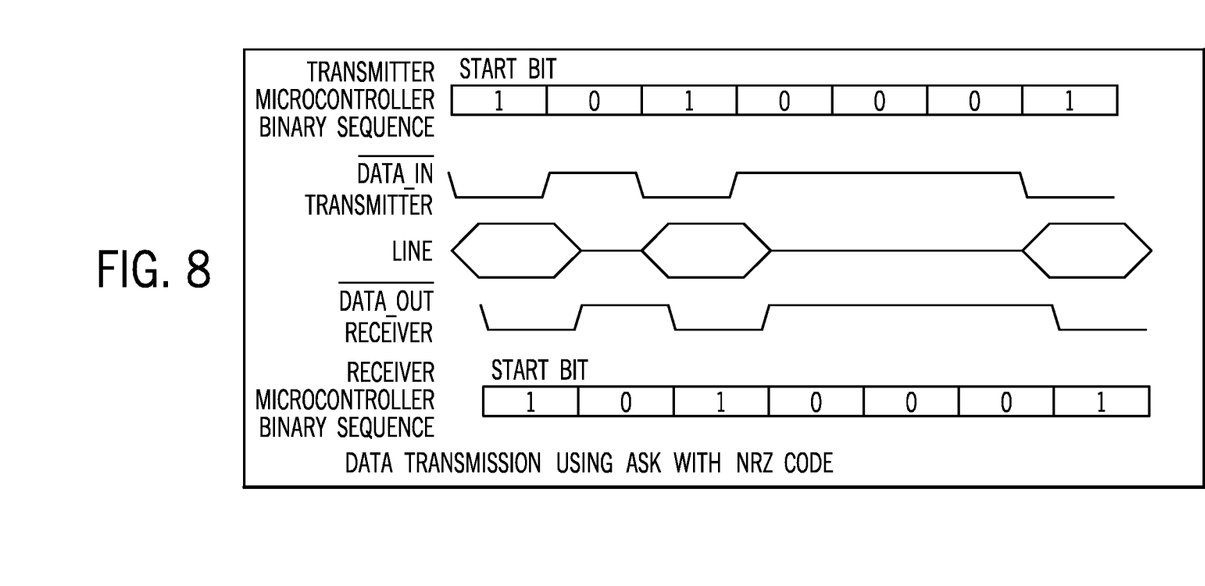
FIG. 8 depicts an example communications (e.g., PLC communications) of binary signals through a smart hose.

FIG. 7 is a block diagram illustrating an example application of power line modems 400, 402 over, for example, hose 100, 300. FIG. 8 depicts an example communications (e.g., PLC communications) of binary signals through the smart hose 100, 300 via, for example, modems 400, 402.

Figure 9:
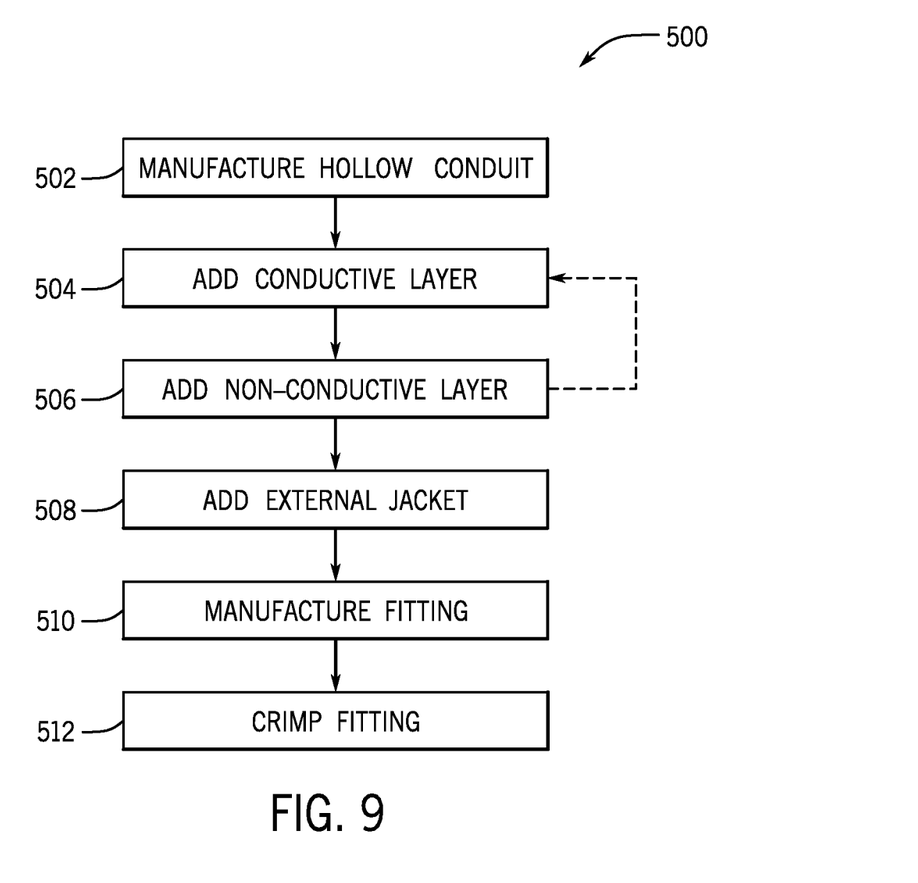
FIG. 9 is a flowchart of an embodiment of a process that may be used to manufacture a smart hose.

FIG. 9 is a flowchart of an embodiment of a process 500 that may be used to manufacture the smart hose 100. In the depicted embodiment, the process 500 may manufacture (block 502) a hollow conduit, such as the conduit 110. The hollow conduit may be used to deliver fluid, and may be made of insulative material. The process 500 may then add (block 504) a conductive layer on top of the hollow conduit, for example braided material, foil, wire, and so on, made of conductive material such as metal. The process 500 may then add (block 506) a non-conductive layer on top of the conductive layer. If more than one conductive layer is used, the process 500 may iterate through blocks 504 and 506 to build up any number of conductive layers, such as 2, 3, 4, 5, 6, 7, 8, or more layers. The process 500 may then add (block 508) an external protective jacket, such as the jacket 102.

If a fitting is desired, such as fitting 200, the process 500 may then first manufacture (block 510) the fitting 200 to include the desired contact and insulation layers. The process 500 may then crimp (block 512) the fitting onto the manufactured hose. Examples of external wire crimping methods are shown in FIG. 4. In this manner, the smart hose 100 may be manufactured, suitable for use in a variety of fluid distribution systems but additionally providing for electrical distribution throughout. The hose 100 may then be used to connect devices at or near the spray gun 28 with, for example, the proportioner system 40, to communicate data and/or electric power between the proportioner system 40 and locations at or near the spray gun 28.

It is to be noted that a current path to/from the distal end of the smart hoses may be desired. This can be accomplished on a single hose with two conductive layers. We are choosing to use two hoses each with a conductive layer to provide the 12-24V differential voltage to create the circuit to the slave modem(s) down the length of the hose (there can be more than one slave). So single hose may have 1 or more layers, and multiple hoses may also have 1 or more layers for electrical signals and power. Sensors may also be placed along the length of the smart hoses described herein to get intermediate data, not just out at the ends of the hoses. The sensors may include pressure sensors sensing fluid pressure of the fluid in the hose, temperature sensors sensing fluid temperatures of the fluid in the hose, fluid flow sensors sending fluid flows of the fluid in the hose, ambient sensors (e.g., ambient conditions such as temperature, light, humidity), and so on.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A fluid delivery system, comprising:
   a proportioner system having a hose set comprising a smart hose, wherein the smart hose of the one or more smart hoses comprises:
   a fluid conduit configured to deliver a fluid;
   a first electrically conductive layer comprising a braided layer, wound wire, or foil, configured to deliver electricity through a length of the smart hose; and
   one or more sensors disposed on the first conductive layer included in the smart hose and configured to transmit sensor data through the first conductive layer, wherein the first electrically conductive layer is configured to deliver the electricity as a data signal, as electric power, or a combination thereof, and wherein the data signal comprises information incoming from the proportioner system, and wherein the proportioner system is configured to deliver a specified ratio between a first fluid and a second fluid to achieve a spray of foam insulation out of a spray gun, wherein the first fluid and the second fluid are each pumped from one of two distinct storage tanks through the smart hose set.

2. The system of claim 1, wherein the information comprises a fluid pressure, a tank level, a remaining quantity of fluid, a fluid flow rate, a fluid temperature, a pump information, a text, an audio, a video, a multimedia, a virtual reality data, an augmented reality data, or a combination thereof.

3. The system of claim 1, comprising a second smart hose of the hose set, wherein the second smart hose is configured to attach to and end the smart hose to increase a length of the smart hose.

4. The system of claim 1 comprising a second smart hose of the hose set, wherein the second smart hose is configured to deliver a second fluid independent of the smart hose, wherein the proportioner system comprises a control system comprising a processor communicatively coupled to one or more actuators.

5. The system of claim 1, comprising a smart hose fitting configured to fluidly couple the smart hose to a second smart hose and to deliver electricity between the smart hose and the second smart hose.

6. The system of claim 1, wherein the data signal comprises information delivered to the proportioner system.

7. The system of claim 6, wherein the information comprises an audio, a text, a video, a multimedia, a command to the proportioner system, a request for proportioner system information, or a combination thereof.

8. The system of claim 1, comprising a spray gun fluidly and communicatively coupled to the proportioner system via the smart hose.

9. A method of manufacturing a proportioner system, comprising:
   manufacturing a hose set comprising a smart hose, the smart hose comprising a hollow conduit that is configured to deliver a fluid via the proportioner system;
   manufacturing a first conductive layer comprising a braided layer, wound wire, or foil, wherein the first conductive layer is configured to deliver electricity through a length of the smart hose;
   disposing one or more sensors on the first conductive layer included in the flexible smart hose and configured to transmit sensor data through the first conductive layer; and
   manufacturing an external jacket, wherein the external jacket comprises the topmost layer of the smart hose, wherein the first electrically conductive layer is configured to deliver the electricity as a data signal, as electric power, or a combination thereof, and wherein the data signal comprises information incoming from the proportioner system, and providing the proportioner system which is configured to deliver a specified ratio between a first fluid and a second fluid to achieve a spray of foam insulation out of a spray gun, wherein the first fluid and the second fluid are each pumped from one of two distinct storage tanks through the hose set.

10. The method of claim 9, comprising manufacturing a second conductive layer, wherein the second conductive layer is configured to deliver electricity through a length of the smart hose.

11. The method of claim 9, comprising manufacturing a smart hose fitting, wherein the smart hose fitting is configured to deliver the electricity to the first conductive layer.

12. The method of claim 11, comprising connecting the smart hose fitting via crimping.

13. A fluid delivery system, comprising:
a proportioner system configured to control a pressure, a temperature, a flow, or a combination thereof, of a first fluid and of a second fluid to deliver a specified ratio between the first fluid and the second fluid, each from one of two distinct tanks, to achieve a spray of foam insulation out of a spray gun;

a hose set comprising at least one smart hose, the hose set configured to deliver the first and the second fluid to the spray gun, wherein the at least one smart hose comprises a hollow conduit configured to deliver the first or the second fluid and a first conductive layer comprising a braided layer, wound wire, or foil configured to deliver electricity through a length of the at least one smart hose; and one or more sensors disposed on the first conductive layer included in the at least one smart hose and configured to transmit sensor data through the first conductive layer, wherein the first conductive layer configured to deliver electricity as a data signal, as electric power, or a combination thereof, and wherein the data signal comprises information incoming from the proportioner system or outgoing to the proportioner system.

14. The system of claim 13, wherein the at least one smart hose is fluidly coupled to a second smart hose via a smart hose fitting to deliver the first or the second fluid and the electricity.

* * * * *